July 2, 1957
W. KEITEL
2,798,210
MINIATURE SLIP RING ASSEMBLY
Filed June 4, 1954
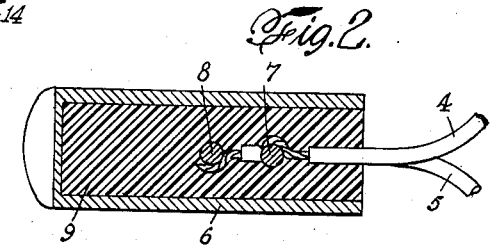
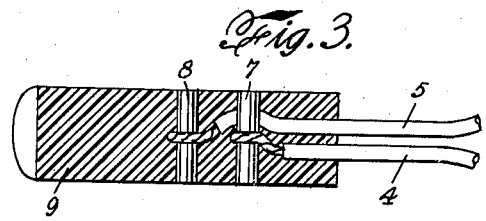
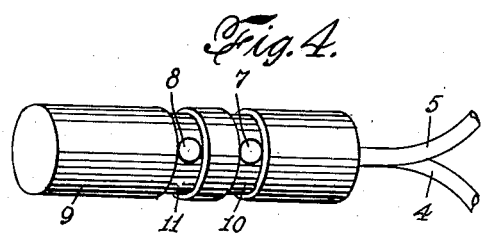
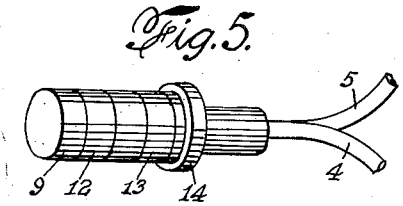
INVENTOR.
WILLIAM KEITEL
BY
ATTORNEY

United States Patent Office 2,798,210
Patented July 2, 1957

2,798,210

MINIATURE SLIP RING ASSEMBLY

William Keitel, East Orange, N. J., assignor to Baker & Co., Inc., Newark, N. J., a corporation of New Jersey Application June 4, 1954, Serial No. 434,356

4 Claims. (Cl. 339—5)

The present invention deals with a slip ring assembly and more particularly with a miniature slip ring assembly.

Miniature circuiting often calls for slip ring assemblies for the transmission of electrical current between revolving electrical components.

Such slip ring assemblies are usually made by embedding end portions of thin copper lead-in wires in plastics of various types and in electrically conducting engagement with slip rings supported by the plastics. For small slip rings these plastics are either cast or injection molded.

The manufacture of small slip ring assemblies with preformed rings, where the lead-in wires are first soldered or welded to the ring and then molded, presents occasional difficulties because most plastics do not adhere well to the metal rings and the assembly has little resistance to torque in machining and tends to break. For this reason small slip ring assemblies are preferably produced without preformed rings and such rings are instead electroplated on the plastic support in contact with the lead-in wires which are embedded in the plastic.

However, even with the electroplated rings, there is still the disadvantage that discontinuity at the point of contact between the lead-in wire and the slip ring will occur in the machining operations because the starting points for electroplating consist of the end of a very thin copper wire for each ring.

It is an object of the present invention to provide a slip ring assembly which will adequately withstand machining operations without being deleteriously affected by the machining operations. It is another object of the present invention to provide a slip ring assembly including an improved means for contacting a slip ring with a lead-in wire. Other objects and advantages will become apparent from the description hereinafter following and drawings forming a part hereof, in which:

Figure 1 illustrates an enlarged elevation view of a lead-in conductor construction according to this invention, Figure 2 is a partly sectional and partly elevational view showing the lead-in conductor of Figure 1 embedded in a supporting body within a mold, Figure 3 is another partly sectional and partly elevational view showing the lead-in conductor of Figure 1 embedded in a supporting body, Figure 4 is an elevational view of a partially completed slip ring assembly, Figure 5 is an elevational view of the complete slip ring assembly according to this invention, and Figure 6 illustrates a cross-sectional view of the completed slip ring assembly.

The present invention deals with miniature slip ring assemblies, whereby the lead-in conductor embedded in a supportnig cylindrical body of plastic or the like insulating material is particularly constructed to provide for an increased area of electrical contact with a metal ring circumferentially bonded to said cylinder and coaxially therewith.

Referring to Figure 1, the particular lead-in conductor comprises a lead-in wire 1, preferably a stranded wire, coated with an insulation 2, e. g. a plastic coating, and having an end portion thereof free of said coating and to which is bonded, as by soldering or welding, an electrically conductive cross-bar 3 secured to said wire transversely thereof. The cross-bar 3, preferably a bar of silver, is particularly dimensioned in that its diameter is at least equal to the diameter of the wire and preferably has a diameter greater than that of the lead-in wire. For example, the wire 1 may be provided with a diameter of 0.02" and the cross-bar with a diameter of 0.025".

Having provided the particular conductor above described, the said conductor is positioned in a cylindrical mold with the cross-bar 3 passing transversely through the axis of the mold, and a plastic material is applied to the mold thereby imbedding the wire therein in known manner. Preferably, a plurality of conductors 4 and 5, as illustrated by Figure 2, are positioned in the mold 6 prior to applying the plastic material, and the conductors are so positioned that the cross-bars 7 and 8 are spaced from each other axially of the mold so that after molding the cross-bars comprise a plurality of cross-bars spaced axially of the plastic cylinder 9 and imbedded therein as illustrated by Figure 3.

While low pressure injection molding and casting of liquid resins can be easily accommodated by fine silver wires of about 0.02" diameter and fine silver cross-bars of about 0.025" diameter, high pressure injection molding requires wires of greater hardness. Silver-palladium alloys have been found suitable, while base metal alloys should be avoided, as they may provide less secure current transmission due to oxidation even when first protected by electrodeposition of fine silver thereupon, and especially if the silvering of the grooves hereinafter described is accomplished by chemical means.

Having removed the hardened plastic cylinder 9 from the mold 6, as shown by Figure 3, the cylinder 9 is grooved by machining circumferentially thereof at the location of the cross-bars 7 and 8, whereupon the machining of the grooves 10 and 11 simultaneously recesses the ends of the cross-bars 7 and 8 within the said grooves, as illustrated by Figure 4.

Thereafter, the grooves 10 and 11 are rendered conductive to electrical current by known physical or chemical application of a thin film or coating of a conductive metal, e. g. silver or gold, etc., to the grooved surfaces and the ends of the cross-bars 7 and 8, and subsequently the said grooves are filled by electrodeposition of fine silver which is finally machined to size thereby providing slip rings 12 and 13 spaced axially of the cylindrical body 9. Preferably, the machining of the slip rings 12 and 13 to size is accomplished simultaneously with the shaping of the body 9 to required dimensions including the forming of a collar 14 between the spaced rings and the wire leads leading to the plastic cylinder.

What I claim is:

1. A slip ring assembly comprising a circumferentially grooved cylindrical body of insulating material, a lead-in wire with an electrically conductive cross-bar bonded transversely thereof substantially at the end of said wire, said cross-bar and a portion of said wire being imbedded in said body, an electrically conductive metal ring circumferentially and coaxially bonded to said body within said groove and in electrical contact with the diametrically opposed ends of said cross-bar.

2. A slip ring assembly according to claim 1 comprising a plurality of lead-in wires and a plurality of cross-bars, said cross-bars and portions of said wires being imbedded in said body with said cross-bars spaced from each other axially of said body, and a plurality of metal rings each circumferentially and coaxially bonded to said body in electrical contact with the diametrically opposed ends of each cross-bar, said rings being spaced axially of said body.

3. A slip ring assembly according to claim 1, wherein said cross-bar has a diameter at least equal to that of said wire.

4. A slip ring assembly according to claim 1, wherein said insulating body is composed of a plastic material.

References Cited in the file of this patent

UNITED STATES PATENTS

| | | |
|---|---|---|
| 1,480,656 | Blackburn | Jan. 15, 1924 |
| 2,265,846 | Krantz | Dec. 9, 1941 |
| 2,400,590 | Meyerhoefer | May 21, 1946 |
| 2,455,864 | Hanna | Dec. 7, 1948 |